3,053,860
PROCESS FOR THE PREPARATION OF UNSATURATED KETO-STEROIDS
Cornelis Maurits Siegmann and Willem Jacob van der Burg, both of Oss, Netherlands, assignors to Organon Inc., West Orange, N.J., a corporation of New Jersey
No Drawing. Filed Nov. 6, 1961, Ser. No. 150,139
Claims priority, application Netherlands Nov. 23, 1960
5 Claims. (Cl. 260—397.3)

The invention relates to a process for the dehydrobromination of keto steroids that have a bromine atom in at least one of the α-positions relative to the keto group, by reaction with a metal carbonate, possibly in the presence of a metal halide, such as a lithium halide.

From United States Patent 2,923,721 it is known that 2,4-dibromo-3-keto steroids can be dehydrobrominated to the corresponding $\Delta^{1,4}$-3-keto steroids by means of lithium carbonate, possibly in the presence of a lithium halide.

Although it might be expected that other alkali metal carbonates than lithium carbonate can also be applied for the said dehydrobromination reaction, experiments have shown that e.g. sodium and potassium carbonate give appreciably lower yields. The impression was consequently created that only the lithium carbonate has special properties to bring about dehydrobrominations.

This impression was strengthened by the results of experiments carried out with some alkaline earth metal carbonates, viz., magnesium and calcium carbonate. In both cases yields of the desired dehydro steroids were low.

Most surprisingly it has been found now that it is possible after all to apply calcium carbonate with a certain crystal structure, viz. the aragonite, for the dehydrobromination of α-bromo-keto steroids giving the same and in some cases even higher yields of the desired dehydro steroid than lithium carbonate.

Aragonite is the rhombic modification of calcium carbonate. This modification is metastable and passes at a high temperature into the stable hexagonal scalenohedric modification of calcium carbonate, viz. calcite.

As starting product in the process according to the invention keto steroids may be applied that have a bromine atom in at least one of the α-positions relating to the keto group.

The process is particularly of great importance when 3-keto steroids of the androstane and pregnane series substituted in 2- and/or 4-position by bromine, are taken as starting material to obtain important steroids with a $\Delta^4$-3-keto grouping, such as testosterone, progesterone and cortisone, or with a $\Delta^{1,4}$-3-keto grouping, such as prednisone.

Also very important starting products are the 3-keto steroids substituted by bromine in 4-position or in 2- and 4-position, which have a sulfonyloxy group in 11α-position. In that case there does not only occur dehydrobromination in the process according to the invention, but the 11α-sulfonyloxy group is also split off while forming a double bond between the carbon atoms 9 and 11. Consequently there is obtained $\Delta^{4,9(11)}$-, or $\Delta^{1,4,9(11)}$-3-keto steroids, which are very important as intermediate products for the preparation of the corresponding 11-hydroxy-9α-halogen steroids.

The dehydrobromination reaction is preferably carried out with aragonite in the presence of a metal halide, such as an alkali metal halide to obtain a higher yield of the desired dehydro steroid.

Examples of suitable alkalimetal halides are lithium bromide, sodium bromide, lithium chloride and lithium iodide. Preferably a lithium halide is used, such as lithium bromide or lithium chloride.

The alkalimetal halide may be applied in an amount of 0–10 mol per mol steroid.

The amount of calcium carbonate applied in the present process may vary widely. Usually, 1–20 mol calcium carbonate per mol steroid is used.

The present dehydrobromination reaction is effected at a temperature of from 80° C. to the boiling temperature of the solvent. The duration of the reaction depends on the reaction temperature and may vary between 1 minute and 20 hours.

It has been found that in some cases application of aragonite with a grain size smaller than 15 m$\mu$ gives higher yields of the desired dehydro steroid than aragonite with a bigger grain.

The reaction is carried out in a suitable solvent, usually a basic organic solvent with a high di-electric constant. Preferably a N,N-dialkyl-acylamide, such as dimethylformamide, diethylformamide, dimethylacetamide or diethylacetamide is used as solvent.

The following examples illustrate the invention.

EXAMPLE I

*Preparation of Cortisone-21-Acetate From 3,11,20-Triketo-17α,21-Dihydroxy - 4β - Bromo-Pregnane-21-Acetate*

Into a 500-ml. three-necked flask fitted with stirrer, thermometer, nitrogen inlet tube and reflux cooler, there are passed 6.9 gm. of lithium bromide and 16.8 gm. of aragonite suspended in 180 ml. of dimethyl formamide.

At normal pressure 30 ml. of dimethyl formamide are distilled off. Then the suspension is cooled to 50° C. Next nitrogen is bubbled through for 5 minutes, after which 30 gm. of 3,11,20-triketo-17α,21-dioxy-4β-bromo-5β-pregnane-21-acetate, $[\alpha]_D = +113°$ (acetone), are added.

Next the reaction mixture is heated to boiling (about 150°) in nitrogen atmosphere, after which the mixture is refluxed for 5 minutes. Then the reaction mixture is cooled to room temperature and poured, while stirring, into 1050 ml. of ice water, after which about 180 ml. of 2 N HCl are added.

The precipitate is filtered by suction, washed with water, taken up in chloroform and filtered.

The chloroform solution is washed with water until neutral and evaporated in vacuo until dry. The residue is recrystallised from acetone to obtain 25.2 gm. of cortisone-21-acetate. From the mother liquor another 0.75 gm. of cortisone-21-acetate is obtained by evaporation and recrystallisation. Melting point 240–246° C.; $[\alpha]_D = +212°$ (dioxane).

EXAMPLE II

*Preparation of $\Delta^{1,4}$-3-Keto - 17β - Hydroxy-Androstadiene-17 - Hexahydro - Benzoate From 2,4-Dibromo-3-Keto-17β-Hydroxy-Androstane-17-Hexahydro-Benzoate*

To a solution of 5.58 gm. of 2,4-dibromo-3-keto-17β-hydroxyandrostane-17-hexahydrobenzoate in 20 ml. of dimethyl formamide there are added 2.6 gm. of lithium bromide and 3.0 gm. of aragonite, after which the reaction mixture is maintained at 90° C. for 16 hours. Then the mixture is cooled and poured into a mixture of 200 ml. of water and 5 ml. of acetic acid. The then obtained precipitate is filtered off, washed with water and dried to obtain 3.90 gm. (98.5%) of $\Delta^{1,4}$-3-keto-17β-hydroxyandrostadiene-17-hexahydrobenzoate; melting point 125° C. Recrystallisation from ethyl acetate gives a pure product of melting point 127–129° C.

In accordance with the process described before the said 2,4-dibromo is converted by means of aragonite into the corresponding $\Delta^{1,4}$-compound by boiling for one minute at 155° C., by heating for 2 hours at 140° C. or by heating for 18 hours at 90° C. to obtain yields of 98–99%.

EXAMPLE III

*Preparation of $\Delta^1$-3,11,20-Triketo-17α,21-Dihydroxy-5α-Pregnene-21-Acetate From 2-Bromo-3,11,20-Triketo-17α,21-Dihydroxy-5α-Pregnane-21-Acetate*

A mixture of 5.1 gm. of lithium chloride, 8.4 gm. of aragonite and 90 ml. of dimethylformamide is boiled till 15 ml. of dimethylformamide is distilled off. Next 15 gm. of 2-bromo-3,11,20-triketo-17α,21-dihydroxy-5α-pregnane-21-acetate ($[\alpha]_D = +108°$) are added to this mixture.

Next this reaction mixture is treated further as stated in Example I to obtain the $\Delta^1$-3,11,20-triketo-17α,21-dihydroxy-5α-pregnane-21-acetate in a yield of 80.5 percent by weight. Melting point 245–248° C.; $[\alpha]_D = +125°$ (chloroform).

EXAMPLE IV

*Preparation of $\Delta^{1,4,9(11)}$-3,20-Diketo-17α,21-Dihydroxy-16α-Methyl-Pregnatriene-21-Acetate From 2,4-Dibromo-3,20-Diketo-11α,17α,21-Trihydroxy-16α-Methyl-5α-Pregnane-11α-Tosylate-21-Acetate*

14 gm. of lithium bromide and 14 gm. of aragonite are added to 320 ml. of dimethyl formamide, after which 20 ml. of dimethyl formamide are distilled off this mixture. After cooling to 50° C. 10 gm. of 11α,17α,21-trihydroxy-3,20-diketo-2,4-dibromo-16α-methyl - allo - pregnane-11α-tosylate-21-acetate (melting point 148–150° C.); $[\alpha]_D = 35°$ (in CHCl$_3$) are added. This mixture is heated for 18 hours in nitrogen atmosphere at 120° C. and then poured into 1.5 l. of water, after which 25 ml. of acetic acid are added. The aqueous mixture is worked up by extraction with CH$_2$Cl$_2$.

The residue of 5.9 gm. is taken up in 10 ml. of a mixture of alcohol-ether (1:1), from which 5.1 gm. of $\Delta^{1,4,9(11)}$ - 17α,21 - dihydroxy - 3,20 - diketo-16α-methyl-pregnatriene-21-acetate are isolated. Melting point 203–207° C.

In an analogous manner the above $\Delta^{1,4,9(11)}$-compound has been obtained by heating 10 gm. of 2,4-dibromo-3,20-diketo-11α,17α,21-trihydroxy - 16α - methyl - 5α - pregnane-11α-tosylate-21-acetate in the presence of 650 ml. of diethyl formamide, 14 gm. of aragonite and 7.9 gm. of lithium chloride for 5 hours at 130° C.

EXAMPLE V

*Preparation of $\Delta^{1,4}$-3,17-Diketo-Androstadiene From 2,4-Dibromo-3,17-Diketo-Androstane*

To a solution of 5.0 gm. of 2,4-dibromo-3,17-diketo-androstane in 35 ml. dimethyl acetamide there are added 2.75 gm. of aragonite, after which the reaction mixture is maintained at 140° C. for one hour. Then the mixture is cooled and poured into a mixture of 200 ml. of water and 5 ml. of acetic acid. The precipitate is filtered off, washed with water and dried to obtain $\Delta^{1,4}$-3,17-diketo-androstadiene in a yield of 98%.

According to the above process the said 2,4-dibromo-3,17-diketo-androstane compound has been converted by means of 2.6 g. aragonite and 2.7 g. sodiumbromide to obtain $\Delta^{1,4}$-3,17-diketo-androstadiene in a yield of 98–99%.

EXAMPLE VI

*Preparation of Prednisone-21-Acetate From 2,4-Dibromo Steroids*

In accordance with the process described in Example I 30 gm. of 2α,4β-dibromo-3,11,20-triketo-17α,21-dihydroxy-5β-pregnane-21-acetate ($[\alpha]_D = -17°$ (acetone)) are converted into prednisone-21-acetate by means of 32.5 gm. of aragonite and 14 gm. of lithium bromide in the presence of 180 ml. of dimethyl formamide. Yield 18.9 gm. Melting point 236–238° C. $[\alpha]_D = +185°$ (dioxane). From the mother liquors another 1.28 gm. of prednisone-21-acetate are obtained.

In the same manner the 2β,4β-dibromo-3,11,20-triketo-17α,21-dihydroxy-5β-pregnane-21-acetate ($[\alpha]_D = +72°$ (dioxane)) is converted into prednisone-21-acetate. The yield of this conversion corresponds with the one mentioned before.

In the same manner as stated above the 2,4-dibromo-allo - dihydro - cortisone - 21 - acetate is converted into prednisone-21-acetate with the same yield as stated before.

EXAMPLE VII

*Preparation of the $\Delta^1$-2-Bromo-3,11,20-Triketo-17α,21-Dihydroxy-5α-Pregnene-21-Acetate*

In accordance with the process described in Example I the 2,2-dibromo-3,11,20-triketo-17α,21-dihydroxy-5α-pregnane-21-acetate is converted into the $\Delta^1$-2-bromo-3,11,20-triketo-17α,21-dihydroxy-5α-pregnene - 21 - acetate by means of aragonite.

EXAMPLE VIII

*Preparation of $\Delta^{1,4}$-3 - Keto-17-Acetoxy-Androstadiene From 2,4-Dibromo-3-Keto-17-Acetoxy-Androstane*

A mixture of 4.3 gm. of sodium bromide, 4.5 gm. of aragonite and 75 ml. of diethylformamide is boiled till 15 ml. of the solvent is distilled off. Next 10 gm. of 2,4-dibromo - 3 - keto - 17β - hydroxy - androstane - 17-acetate are added, after which the mixture is heated for one hour at 140° C. and treated further as described in Example I to obtain $\Delta^{1,4}$-3-keto-17β-acetoxy-androstadiene in a yield of 99%.

We claim:

1. Process for the dehydrobromination of 3-keto-steroids of the androstane and pregnane series having a bromine atom in at least one of the positions 2 and 4, comprising reacting said steroid with aragonite to obtain the corresponding dehydro-3-keto-steroid selected from the group consisting of a $\Delta^1$-, $\Delta^4$-, and $\Delta^{1,4}$-3-keto-steroid of the androstane and pregnane series.

2. Process according to claim 1 comprising reacting a keto-steroid having a bromine atom in at least one of the α-positions relating to the keto group with aragonite in an amount of between 1 and 20 moles per mole steroid in the presence of an N,N'-dialkylacylamide, heating to a temperature between 80° C. and the boiling point of the organic solvent for a period of time between one minute and 20 hours.

3. Process according to claim 1, comprising reacting a keto-steroid having a bromine atom in at least one of the α-positions relating to the keto group with aragonite in an amount of between 1 and 20 moles per mole steroid in the presence of an N,N'-dialkylacylamide and an alkalimetal halide in an amount of between 0.1 and 12 moles per mole steroid, heating to a temperature between 80° C. and the boiling point of the organic solvent for a period of time between one minute and 20 hours.

4. Process according to claim 2, in which the N,N'-dialkylacylamide is an N,N'-di(lower)alkyl (lower) acylamide.

5. Process according to claim 4, in which the N,N'-dialkylacylamide is selected from the group consisting of dimethylformamide, diethylformamide, dimethylacetamide and diethylacetamide.

No references cited.